M. Gerhard,

Vegetable Cutter,

No. 100,280.  Patented Mar. 1, 1870.

Witnesses:
Alex L. Roberts
Jno. E. Brooks

Inventor:
M. Gerhard
per Mumm & Co.
Attorneys.

United States Patent Office.

MICHAEL GERHARD, OF NEWARK, NEW JERSEY.

Letters Patent No. 100,280, dated March 1, 1870.

IMPROVEMENT IN VEGETABLE-CUTTER.

The Schedule referred to in these Letters Patent and making part of the same.

*To all whom it may concern:*

Be it known that I, MICHAEL GERHARD, of Newark, in the county of Essex, and State of New Jersey, have invented a new and improved Vegetable-Cutter; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
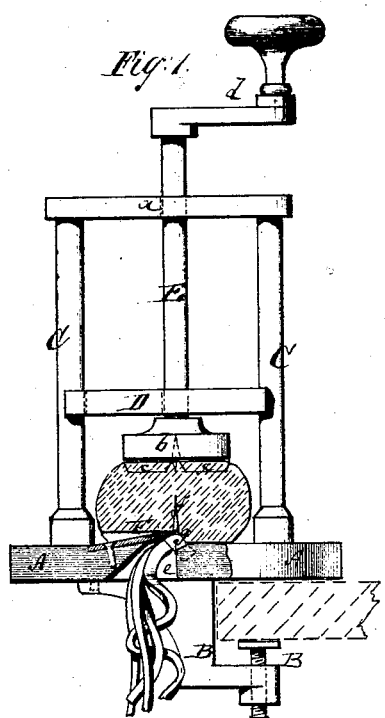
Figures 1 and 2 are side views, partly in section, of my improved vegetable-cutter, showing different kinds of cutters.
Figure 2:
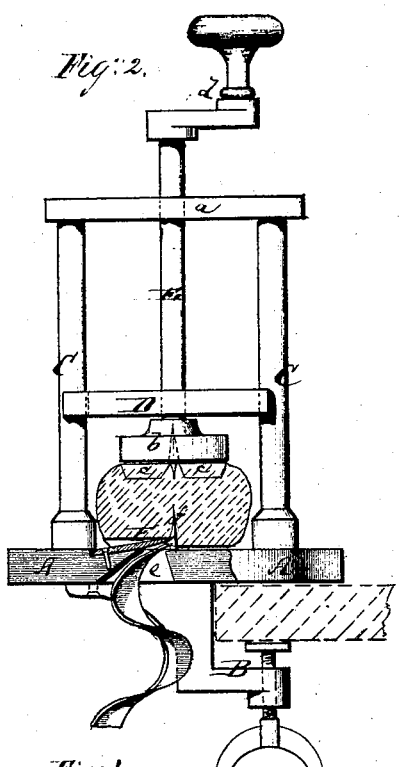

This invention relates to a novel and very simple implement for cutting all kinds of vegetables, such as turnips, potatoes, &c., into slices or strips, and for thereby preparing the same for use.

The invention consists in the combination and arrangement of parts, as hereinafter specified.

A in the drawing represents a plate, of circular or other form, secured to a clamp, B, by means of which it can be easily fastened to a table, window-sill, chair-back or other suitable stationary apparatus.

From the plate project upward two posts, C C, which are, at their upper ends, connected by a cross-bar, a.

Through this cross-bar, and through a cross-head, D, which slides between the posts C, is fitted a vertical shaft, E, which can revolve as well as slide vertically in the said bars a D, the latter being also vertically adjustable.

The shaft carries, at its lower end, a disk, b, which, at its lower face, has downward-projecting openings or cutters c c.

On the upper end of the shaft is a crank, d, for revolving the same.

The plate A has an aperture, e, extending from the centre toward one side, and over this aperture is placed a planing-knife or cutter, F, in an inclined position.

From the centre of the plate A projects upward a pointed pin, f.

The fruit to be cut is placed upon the pin f, and the shaft is then let down upon it, so that its blades c will enter the fuit. The shaft is now revolved, and, by means of the openings, the fruit is carried around with it.

While being revolved, pressure is applied to the shaft, to force the fruit upon the plate, and to feed it downward as it is being gradually reduced by the knife.

The knife cuts the fruit into slices, which pass down through the aperture e.

Figure 3:
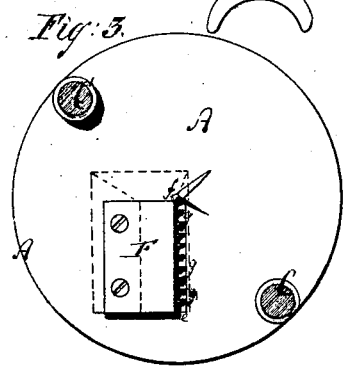
Figure 3 is a plan or top view, partly in section, of the same.
Figure 4:
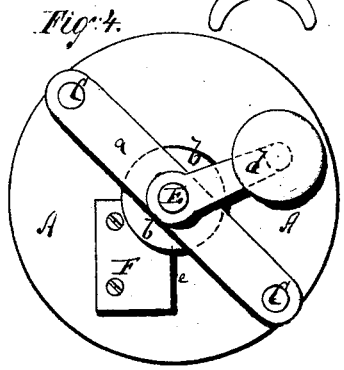
Figure 4 is a plan or top view of the same.

When it is desired to cut the fruit into narrow strips, cross-cutters g g are set up at the required distances between the edge of the knife F and that side of the aperture e which is opposite to the cutting-edge of F, as in figs. 1 and 3.

By means of these transverse cutters, the fruit will be cut into long spiral strips, which are readily cooked, and whereby the fruit is more perfectly prepared for the table.

Having thus described my invention,

I claim as new, and desire to secure by Letters Patent—

The combination of the plate A, centre pin f, posts C, and cross-bar a, with the sliding revolving shaft E, openings e, and cutters F, all arranged to operate as set forth.

MICHAEL GERHARD.

Witnesses:
 GEO. W. MABEE,
 A. V. BRIESEN.